UNITED STATES PATENT OFFICE.

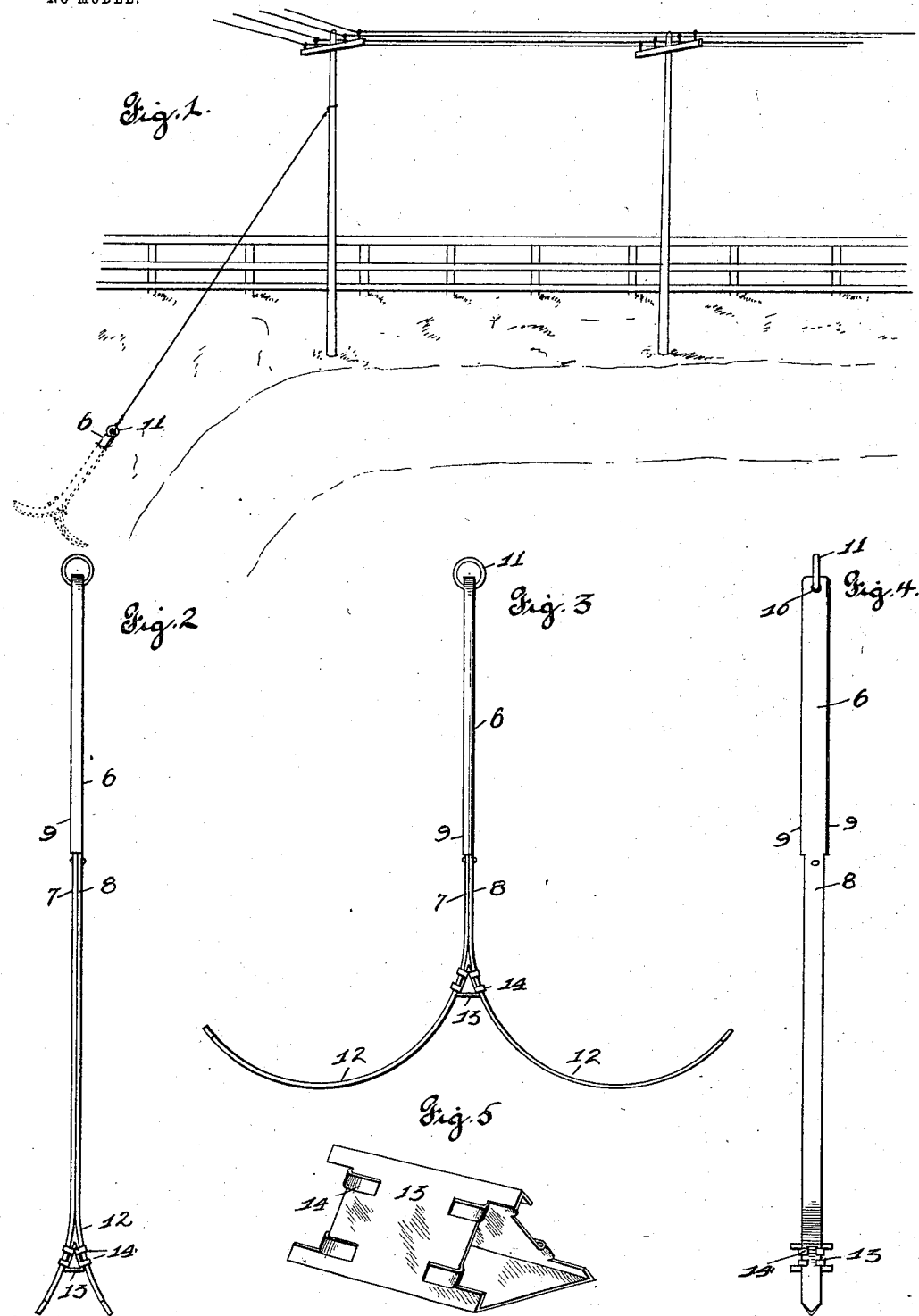

JASPER BLACKBURN, OF CHILLICOTHE, MISSOURI.

POST-ANCHOR.

SPECIFICATION forming part of Letters Patent No. 725,398, dated April 14, 1903.

Application filed September 29, 1902. Serial No. 125,161. (No model.)

*To all whom it may concern:*

Be it known that I, JASPER BLACKBURN, of the city of Chillicothe, Livingston county, State of Missouri, have invented certain new and useful Improvements in Post-Anchors, of which the following is a full, clear, and exact description, reference being had to the accompanying drawings, forming a part hereof.

My invention relates to post-anchors; and it consists of the novel construction, combination, and arrangement of parts hereinafter shown, described, and claimed.

The object of this invention is to construct a device to be driven into the ground and its prongs extending outwardly to prevent the device from being withdrawn, and is to be used in connection with telegraph-poles for bracing the same with guy-wires.

Figure 1 is a view showing my improved anchor in its operative position. Fig. 2 is a side view of the same. Fig. 3 is a side view showing the prongs in an extended position. Fig. 4 is a front view of the device. Fig. 5 is a detail perspective view of the wedge made use of in connection with my invention.

In the construction of my improved invention I provide a stake 6, composed of two parts 7 and 8, the part 8 having its upper portion provided with flanges 9, which are adapted to be bent around the edges of the portion 7 and clamp tightly thereon, forming a rigid upper portion. Through the upper end of the stake is a hole 10, through which a ring 11 or a wire may be passed and fastened. The lower ends of the parts 7 and 8 form prongs 12, their ends being pointed, and between said prongs is placed a wedge 13, which is for the purpose of spreading said prongs laterally and locking the same when the stake is driven into the ground. The wedge is provided with ears 14, which are preferably cut from the same material as the wedge and bent over the prongs.

In applying my invention in operative use a hole of sufficient depth is first dug, and the device when in position as shown in Fig. 2 is placed within the hole. The stake is then driven upon and the wedge coming in contact with the ground will cause the prongs to spread outwardly through the sides of the hole into the ground, thus holding the stake firmly in position and preventing the same from being withdrawn.

The device is preferably applied at an angle, as shown in Fig. 1, and the guy-wire fastened to the pole is also fastened to the ring or opening of the anchor.

To prevent the wedge from passing too high between the prongs, I place a rivet or bolt through the two sections and preferably located immediately below the projecting flanges 9. This will prevent the sections from being spread at that point held by the flanges.

I claim—

1. A post-anchor, having prongs, a wedge located between the free ends of said prongs, whereby the ends of the prongs will be driven outwardly when the prongs are driven into the ground; and ears formed on the wedge and bent over the strips, substantially as and for the purpose as specified.

2. A post-anchor, composed of two strips, projecting flanges formed on one of said strips, said strips held together and stiffened by said flanges, a wedge located between the free ends of said strips, and ears formed on said wedge and bent over the strips, said strips projecting outwardly when driven into the ground, substantially as specified.

In testimony whereof I affix my signature in presence of two witnesses.

JASPER BLACKBURN.

Witnesses:
FRANKLIN CANADAY,
J. E. WATKINS.